(12) United States Patent
Xin et al.

(10) Patent No.: US 8,922,556 B2
(45) Date of Patent: Dec. 30, 2014

(54) LINE SPACE GATHERING FOR SINGLE SCATTERING IN LARGE SCENES

(75) Inventors: Sun Xin, Beijing (CN); Stephen S. Lin, Beijing (CN); Baining Guo, Beijing (CN)

(73) Assignee: Microsoft Corporation, Redmond, WA (US)

( * ) Notice: Subject to any disclaimer, the term of this patent is extended or adjusted under 35 U.S.C. 154(b) by 711 days.

(21) Appl. No.: 13/089,122

(22) Filed: Apr. 18, 2011

(65) Prior Publication Data

US 2012/0262456 A1   Oct. 18, 2012

(51) Int. Cl.
  *G06T 15/50* (2011.01)
  *G06T 15/06* (2011.01)
(52) U.S. Cl.
  CPC .............. *G06T 15/06* (2013.01); *G06T 15/506* (2013.01)
  USPC ........................................................ 345/426
(58) Field of Classification Search
  None
  See application file for complete search history.

(56) References Cited

U.S. PATENT DOCUMENTS

| | | | |
|---|---|---|---|
| 6,268,861 B1 | 7/2001 | Sanz-Pastor et al. | |
| 7,091,973 B1 | 8/2006 | Cohen | |
| 7,133,041 B2 | 11/2006 | Kaufman et al. | |
| 7,333,107 B2 | 2/2008 | Papageorgiou | |
| 7,701,455 B2 | 4/2010 | Tsao | |
| 2008/0033277 A1 | 2/2008 | Yang et al. | |
| 2009/0006044 A1 | 1/2009 | Zhou et al. | |
| 2010/0085360 A1 | 4/2010 | Ren et al. | |

OTHER PUBLICATIONS

Xin Sun, Kun Zhou, Stephen Lin, Baining Guo, "Line Space Gathering for Single Scattering in Large Scenes", Jul. 2010, ACM, ACM Transactions on Graphics (TOG)—Proceedings of ACM SIGGRAPH 2010, vol. 29, Issue 4, Article No. 54.*
Bernard Chazelle, Herbert Edelsbrunner, Leonidas J. Guibas, Micha Sharir, "Lines in Space—Combinatorics, Algorithms and Applications", May 17, 1989, ACM, STOC '89, Proceedings of the twenty-first annual ACM symposium on Theory of computing, pp. 382-393.*
Turner Whitted, "An Improved Illumination Model for Shaded Display", Jun. 1980, ACM, Communications of the ACM, vol. 23, No. 6, pp. 343-349.*
Basri, et al. "A general framework for approximate nearest subspace search" http://webee.technion.ac.il/lihi/Publications/BHZM_TechReport_2008.pdf, 14 pages.
Chen, et al. "Theory and application of specular path perturbation" http://www.ics.uci.edu/arvo/papers/TOG-2000.pdf, 35 pages.

(Continued)

*Primary Examiner* — Ryan R Yang
*Assistant Examiner* — Robert Bader
(74) *Attorney, Agent, or Firm* — Dan Choi; Judy Yee; Micky Minhas

(57) ABSTRACT

A light gathering process may reduce the computational resources and storage required to render a scene with a participating homogeneous media. According to some implementations, Efficiency may be obtained by evaluating the final radiance along a viewing ray directly from the lighting rays passing near to it, and by rapidly identifying such lighting rays in the scene. To facilitate a search for nearby lighting rays, the lighting rays and viewing rays may be represented as a 6D point and a plane according to the corresponding Plucker coordinates and coefficients, respectively.

17 Claims, 8 Drawing Sheets

(56) References Cited

OTHER PUBLICATIONS

Duncan, "Balanced aspect ratio trees: combining the advantages of k-d trees and octrees" http://citeseerx.ist.psu.edu/viewdoc/download?doi=10.1.1.84.4830&rep=rep1&type=pdf 31 pages.

Ernst, et al. "Interactive rendering of caustics using interpolatedwarped volumes" http://citeseerx.ist.psu.edu/viewdoc/download?doi=10.1.1.95.945&rep=rep1&type=pdf, 10 pages.

Hou, et al. "Bsgp: bulk-synchronous gpu programming" http://citeseerx.ist.psu.edu/viewdoc/download?doi=10.1.1.164.8631&rep=rep1&type=pdf 12 pages.

Hou, et al. "Memory-scalable GPU spatial hierarchy construction" http://www.kunzhou.net/2009/mem-hierarchy-tr.pdf 7 pages.

Hu, W., Dong, Z., Ihrke, I., Grosch, T., and Seidel, H.P. 2009. Real-time volume caustics in single-scattering media. Tech. Rep. MPI 2009 4 007.

Ihrke, et al. "Eikonal rendering: efficient light transport in refractive objects" http://people.mmci.uni-saarland.de/ihrke/Publications/sig07.pdf 9 pages.

Iwasaki, et al. "An efficient method for rendering underwater optical effects using graphics hardware." http://visl.technion.ac.il/projects/2004spring/iwasaki1.pdf, 11 pages.

Jarosz, et al. "Radiance caching for participating media" http://graphics.ucsd.edu/henrik/papers/radiance_caching_sketch/radiance_caching_sketch.pdf, 1 page.

Jarosz, et al. "The beam radiance estimate for volumetric photon mapping" http://zurich.disneyresearch.com/wjarosz/publications/jarosz08beam.pdf, 10 pages.

Jensen, et al. "Efficient simulation of light transport in scences with participating media using photon maps" http://delivery.acm.org/10.1145/290000/280925/p311jensen.pdf?key1=280925&key2=6774322921&coll=DL&dl=ACM&CFID=1979180&CFTOKEN=45097341, 10 pages.

Kajiya, "The rendering equation" http://inst.eecs.berkeley.edu/cs294-13/fa09/lectures/p143-kajiya.pdf 8 pages.

Kriger, et al. "Interactive screen-space accurate photon tracing on GPUs" http://www.google.co.in/url?sa=t&source=web&cd=1&ved=0CBYQFjAA&url=http%3A%2F%2Fciteseerx.ist.psu.edu%2Fviewdoc%2Fdownload%3Fdoi%3D10.1.1.71.2946%26rep%3Drep1%26type%3Dpdf&ei=pjAFTb3OLoTqrAe8maGRDw&usg=AFQjCNHqo3tHYfdC6QDMONsU2qPmXcTioA&sig2=jwA2mYT-di2e6h91EhEyew, 12 pages.

Max, "Atmospheric illumination and shadows" http://delivery.acm.org/10.1145/20000/15899/p117-max.pdf?key1=15899&key2=1515322921&coll=DL&dl=ACM&CFID=1979180&CFTOKEN=45097341.

Martens, et al., "Efficient Rendering of Local Subsurface Scattering"—Published Date: 2003 http://web4.cs.ucl.ac.uk/staff/j.kautz/publications/localsssPG03.pdf, 8 pages.

Mitchell, et al. "Illumination from curved reflectors" http://citeseerx.ist.psu.edu/viewdoc/download?doi=10.1.1.37.8196&rep=rep1&type=pdf 10 pages.

Premoze, et al. "Practical rendering of multiple scattering effects in participating media"—Published Date: 2004 http://www.cs.berkeley.edu/ravir/HRPIEG.pdf, 12 pages.

Ren, et al. "Gradient-based interpolation and sampling for real-time rendering of inhomogeneous single-scattering media" http://www.kunzhou.net/2008/MSR-TR-2008-51.pdf 7 pages.

Zhou, et al. "Real-Time Smoke Rendering Using Compensated Ray Marching" http://www.kunzhou.net/2008/smoke.pdf, 11 pages.

Stolfi, "Primitives for computational geometry" http://www.hpl.hp.com/techreports/Compaq-DEC/SRC-RR-36.pdf, 244 pages.

Sun, et al., "A practical analytic single scattering model for real time rendering" http://www.cs.berkeley.edu/~ravir/papers/singlescat/scattering.pdf, 10 pages.

Sun et al., "Interactive relighting of dynamic refractive objects" http://www.kunzhou.net/2008/refraction.pdf, 10 pages.

Ealter et al., "Single scattering in refractive media with triangle mesh boundaries." https://www.shuangz.com/projects/amber/amber.pdf, 7 pages.

Wyman, et al. "Interactive volumetric shadows in participating media with single-scattering" http://ieeexplore.ieee.org/stamp/stamp.jsp?arnumber=04634627, 4 pages.

Zhou, et al. "Fogshop: Real-time design and rendering of inhomogeneous, single scattering media" http://research.microsoft.com/en-us/um/people/johnsny/papers/fogshop-pg.pdf 10 pages.

Zhou, et al. "Real-time KD-tree construction on graphics hardware" http://www.kunzhou.net/2008/kdtree.pdf, 11 pages.

Shreiner et al., "OpenGL Programming Guide: The Official Guide to Learning OpenGL", Addison-Wesley; 5th Edition, Aug. 11, 2005, pp. 261-270.

* cited by examiner

LINE SPACE GATHERING FOR SINGLE SCATTERING IN LARGE SCENES

BACKGROUND

Global illumination of a 3D scene in a media source by and large utilizes an algorithm, such as volumetric photon mapping, to diffuse inter-reflection within the scene. Generally, the algorithm is designed to take into effect the light ray coming from a source as well as light rays from the source reflected by other surfaces in the scene. Typically, images rendered using global illuminations tend to appear more realistic than images rendered using only a direct illumination algorithm.

Traditionally, volumetric photon mapping has been the only solution to render quality volumetric effects. Volumetric photon mapping is a general solution to volumetric rendering and is efficient in rendering both single scattering and multiple scattering with homogeneous and inhomogeneous media. However, volumetric photon mapping is computationally expensive if you specifically want to render single scattering with homogeneous participating media. For example, the visual effects of single scattering are typically high frequency and thus require dense sampling of light flux in order to render the light path properly. This dense sampling may lead to a substantial storage and computational cost, limiting both performance and the size of a scene that can be rendered.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Some implementations herein include a light gathering process that may reduce the computational resources and storage required to render a scene with a participating homogeneous media. According to some implementations, efficiency may be obtained by evaluating the final radiance along a viewing ray directly from the lighting rays passing near to it, and by rapidly identifying such lighting rays in the scene. To facilitate a search for nearby lighting rays, the lighting rays and viewing rays may be represented by a 6D point and plane according to the corresponding Plücker coordinates and coefficients, respectively.

In some implementations, a line space gathering module is used construct a hierarchy based upon the geometry of the initial media stream. The line space gathering module may be used to trace rays from a light source and from a viewpoint. The rays may be reflected and refracted as they traverse the scene. This information may be used to compute the initial flux of each lighting ray segment and the initial transmittance-to-viewpoint of each viewing ray segment in a 6D parametric line space. While in the 6D parametric line space, the lighting rays that intersect each of the viewing rays may be gathered and the radiance transfer between them computed. The final radiances of the viewing rays may be deposited to the corresponding shading pixels to produce the final media stream.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

Some implementations herein provide a process for the rendering of a high quality volumetric effect. More specifically, an example process may render a single scattering with homogeneous participating media using a light ray gathering approach. This approach to gathering lighting rays supports complex light paths with multiple reflections and refractions, and avoids the use of a volume representation, which may be expensive for large-scale scenes. Efficiency may be obtained by evaluating the final radiance along a viewing ray directly from the lighting rays passing near to it, and by rapidly identifying such lighting rays in the scene. To facilitate a search for nearby lighting rays, the lighting rays and viewing rays may be represented as a 6D point and plane according to the corresponding Plucker coordinates and coefficients, respectively.

This approach for light space gathering is not limited to a particular type of light path or volume of fixed resolution. For example, without limitation, the approach may be integrated into a ray tracing framework as a substitute for volumetric photon mapping to render single scattering in a homogeneous volumetric material. Furthermore, this approach may be combined with other techniques such as, without limitation, photon mapping and shadow maps to efficiently handle single scattering within a more comprehensive rendering system.

Exemplary Environment

Figure 1:
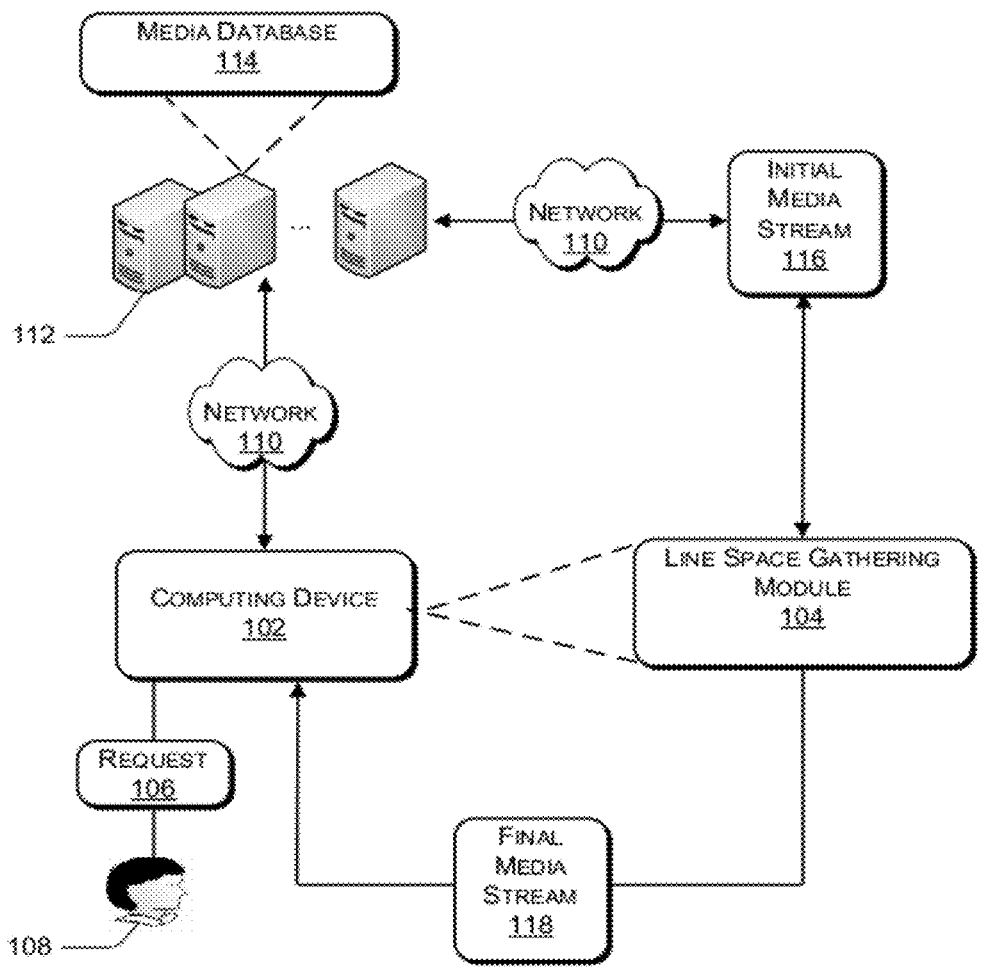
FIG. 1 is a schematic of an illustrative environment for a line space gathering framework.

FIG. 1 is a block diagram of an example environment 100, which may be used as a framework for rendering high quality single scattering in large scenes with homogenous media. The environment 100 includes an example computing device 102, which may take a variety of forms including, but not limited to, a portable handheld computing device (e.g., a personal digital assistant, a smart phone, a cellular phone), a laptop computer, a desktop computer, a media player, a digital camcorder, an audio recorder, a camera, or any other similar device.

The computing device 102 may include a line space gathering module 104 to render a single scattering of an image within a homogeneous media stream that contains reflective and refractive objects. The line space gathering module 104 may also, without limitation, be integrated into a ray tracing framework or combined with another rendering technique to manage single scattering within a more comprehensive rendering system. While FIG. 1 shows the line space gathering module 104 residing on the computing device 102, it is to be appreciated that alternatively the line space gathering module 104 may reside on a server or may be a standalone component.

The computing device 102 may receive a request 106 for the retrieval of and the presentation of a participating media from the user 108. The request 106 may be communicated over network 110 to at least one server 112. The network(s) 110 represent any type of communications network(s), including, but not limited to, wire-based networks (e.g., cable), wireless networks (e.g., cellular, satellite), cellular telecommunications network(s), and IP-based telecommunications network(s). The network(s) 104 may also include traditional landline or a public switched telephone network (PSTN), or combinations of the foregoing (e.g., Unlicensed Mobile Access or UMA networks, circuit-switched telephone networks or IP-based packet-switch networks).

The server 112 may include, without limitation, a homogeneous media database 114. The media database may include substantially real-time content, non-real time content, or a combination of the two. Sources of substantially real-time content generally include those sources for which content is changing over time, such as, for example, live television or radio, webcasts, or other transient content. Non-real time content sources generally include fixed media readily accessible by a consumer, such as, for example, pre-recorded video, audio, text, multimedia, games, or other fixed media readily accessible by a consumer. While FIG. 1 show the media database residing on the server 112, it is to be appreciated that alternatively the media database may reside on the computing device 102.

An initial media stream 116 may be communicated to the line space gathering module 104 for processing. The line space gathering module may utilize an algorithm for the efficient rendering of the high frequency effects of a single scattering in the homogeneous media stream while accounting for light interactions to produce a final media stream 118.

Figure 2:
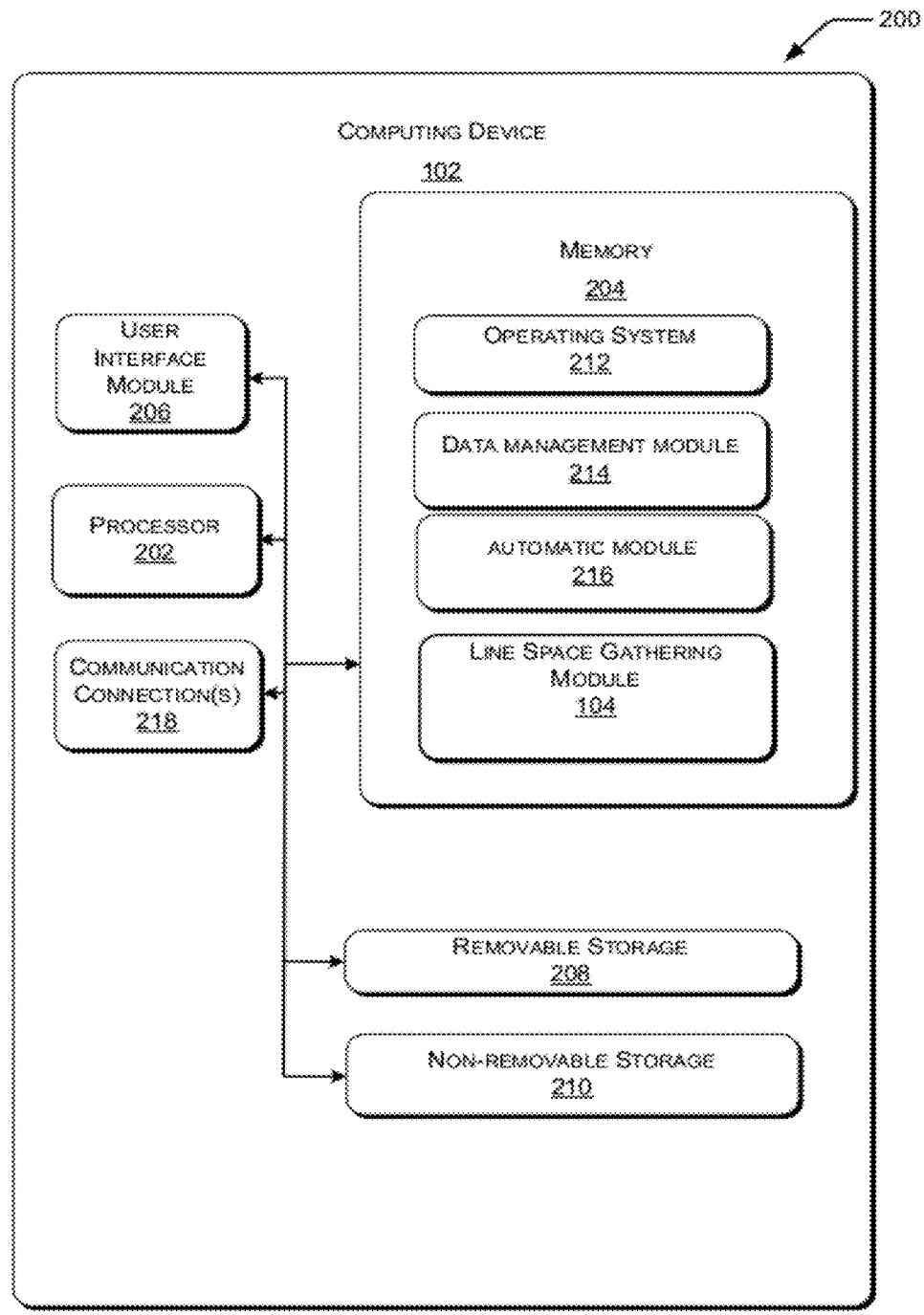
FIG. 2 is a block diagram of an example computing device within the line space gathering framework of FIG. 1.

FIG. 2 is a schematic block diagram 200 of an example computing device 102. In one example configuration, the computing device 102 comprises at least one processor 202, a memory 204, and a user interface module 206. The processor 202 may be implemented as appropriate in hardware, software, firmware, or combinations thereof. Software or firmware implementations of the processor 202 may include computer or machine executable instructions written in any suitable programming language to perform the various functions described.

Memory 204 may store programs of instructions that are loadable and executable on the processor 202, as well as data generated during the execution on these programs. Depending on the configuration and type of server, memory 204 may be volatile (such as RAM) and/or non-volatile (such as ROM, flash memory, etc.). The computing device 102 may also include additional removable storage 208 and/or non-removable storage 210 including, but not limited to, magnetic storage, optical disks, and/or tape storage. The disk drives and their associated computer-readable medium may provide non-volatile storage of computer readable instructions, data structures, program modules, and other data for the computing device 102.

Memory 204, removable storage 208, and non-removable storage 210 are all examples of computer storage media. Examples of suitable computer storage media that may be present include, but are not limited to, RAM, ROM, flash memory or other memory technology, CD-Rom, DVD, or other optical storage magnetic cassettes, magnetic tape, magnetic disk storage (e.g., floppy disc, hard drive) or other magnetic storage devices, or any other medium which may be used to store the desired information. In some implementations, the memory 204, removable storage 208, and non-removable storage 210 may be non-transitory computer-readable media.

Turning to the contents of memory 204 in more detail, the memory may include an operating system 212 and the line space gathering module 104. The line space gathering module may construct a hierarchy based upon the geometry of the initial media stream 116. In one implementation, a kd-tree technique is employed. However, it is to be appreciated that any suitable technique may be used. The line space gathering module 104 may be used to trace rays from a light source and from a viewpoint. The rays may be reflected and refracted as they traverse the scene. This information may be used to compute the initial flux of each lighting ray segment and the initial transmittance-to-viewpoint of each viewing ray segment in a 6D parametric line space. While in the 6D parametric line space, the lighting rays that intersect each of the viewing rays may be gathered and the radiance transfer between them computed. The final radiances of the viewing rays may be deposited to the corresponding shading pixels to produce the final media stream 126.

In one implementation, the memory 204 may further include a data management module 214 and an automatic module 216. The data management module 214 stores and manages storage of information, such as images, return on investment (ROI), equations, and the like, and may communicate with one or more local and/or remote databases or services. The automatic module 216 allows the process to operate without human intervention. The computing device 102 may also contain communication connection(s) 218 that allow processor 202 to communicate with other services. Communications connection(s) 218 is an example of a communication medium. A communication medium typically embodies computer-readable instructions, data structures, and program modules. By way of example and not limitation, communication medium includes wired media such as a wired network or direct-wired connection, and wireless media such as acoustic, RF, infrared and other wireless media.

The computing device 102, as described above, may be implemented in various types of systems or networks. For example, the computing device may be a stand-alone system, or may be a part of, without limitation, a client server system, a peer-to peer computer network, a distributed network, a local area network, a wide area network, a virtual private network, a storage area network, and the like.

Figure 3:
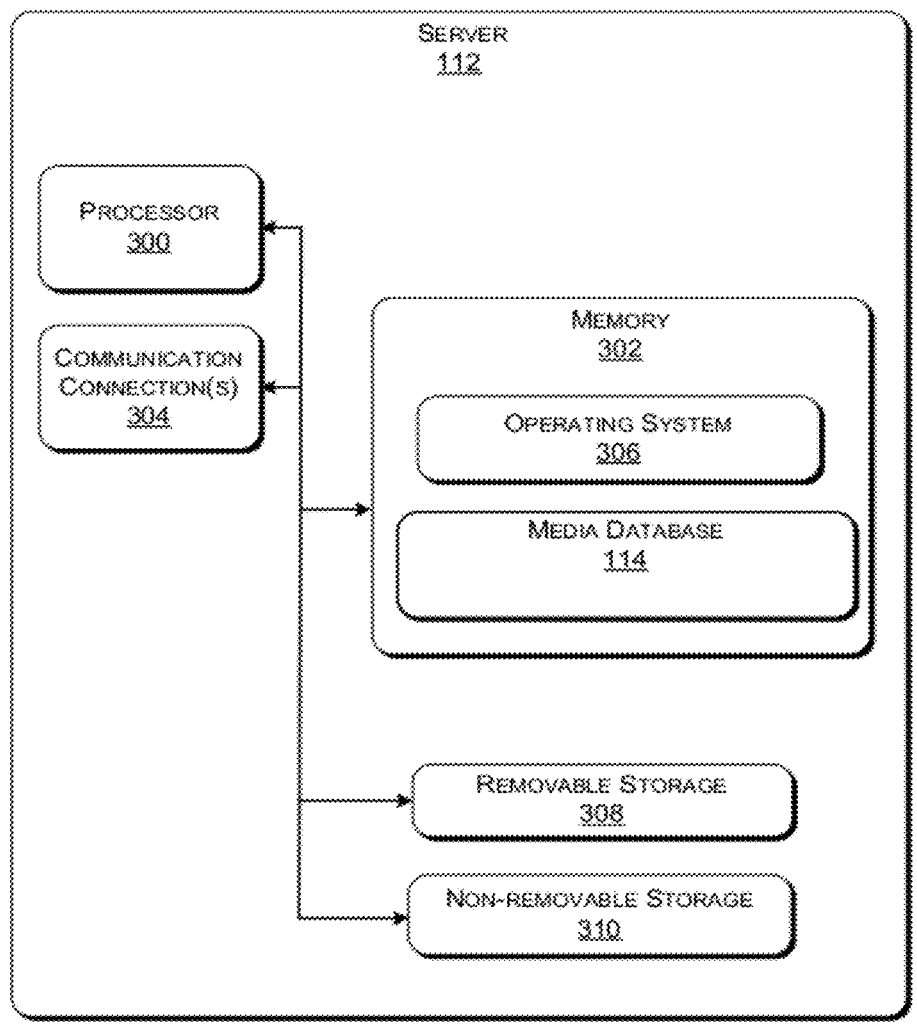
FIG. 3 is a block diagram of an example server within the line space gathering framework of FIG. 1.

FIG. 3 illustrates an example server 112. The server 112 may be configured as any suitable system capable of services. In one example configuration, the server 112 comprises at least one processor 300, a memory 302, and a communication connection(s) 304. The communication connection(s) 304 may include access to a wide area network (WAN) module, a local area network module (e.g., WiFi), a personal area network module (e.g., Bluetooth®), and/or any other suitable communication modules to allow the server 112 to communicate over the network(s) 104.

Turning to the contents of the memory 302 in more detail, the memory 302 may store an operating system 306 and the media database 114. While the media database 114 is illustrated in this example as a component within the server 112, it is to be appreciated that the media database may alternatively be, without limitation, a component within the computing device 102 or a standalone component.

The server 112 may also include additional removable storage 308 and/or non-removable storage 310. Any memory described herein may include volatile memory (such as RAM), nonvolatile memory, removable memory, and/or non-removable memory, implemented in any method or technology for storage of information, such as computer-readable instructions, data structures, applications, program modules, emails, and/or other content. Also, any of the processors described herein may include onboard memory in addition to or instead of the memory shown in the figures. The memory may include storage media such as, but not limited to, random access memory (RAM), read only memory (ROM), flash memory, optical storage, magnetic disk storage or other magnetic storage devices, or any other medium which can be used to store the desired information and which can be accessed by the respective systems and devices.

The server 112 as described above may be implemented in various types of systems or networks. For example, the server may be part of, including but not limited to, a data center, a server form, a client-server system, a peer-to-peer computer network, a distributed network, an enterprise architecture, a local area network, a wide area network, a virtual private network, a storage area network, and the like. For example, in one implementation, the server 112 may be associated with a web search engine such as Microsoft's Bing®.

Various instructions, methods, techniques, applications, and modules described herein may be implemented as computer-executable instructions that are executable by one or more computers, servers, or computing devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various implementations. An implementation of these modules and techniques may be stored on or transmitted across some form of computer-readable media.

Exemplary Line Space Gathering

Figure 4:
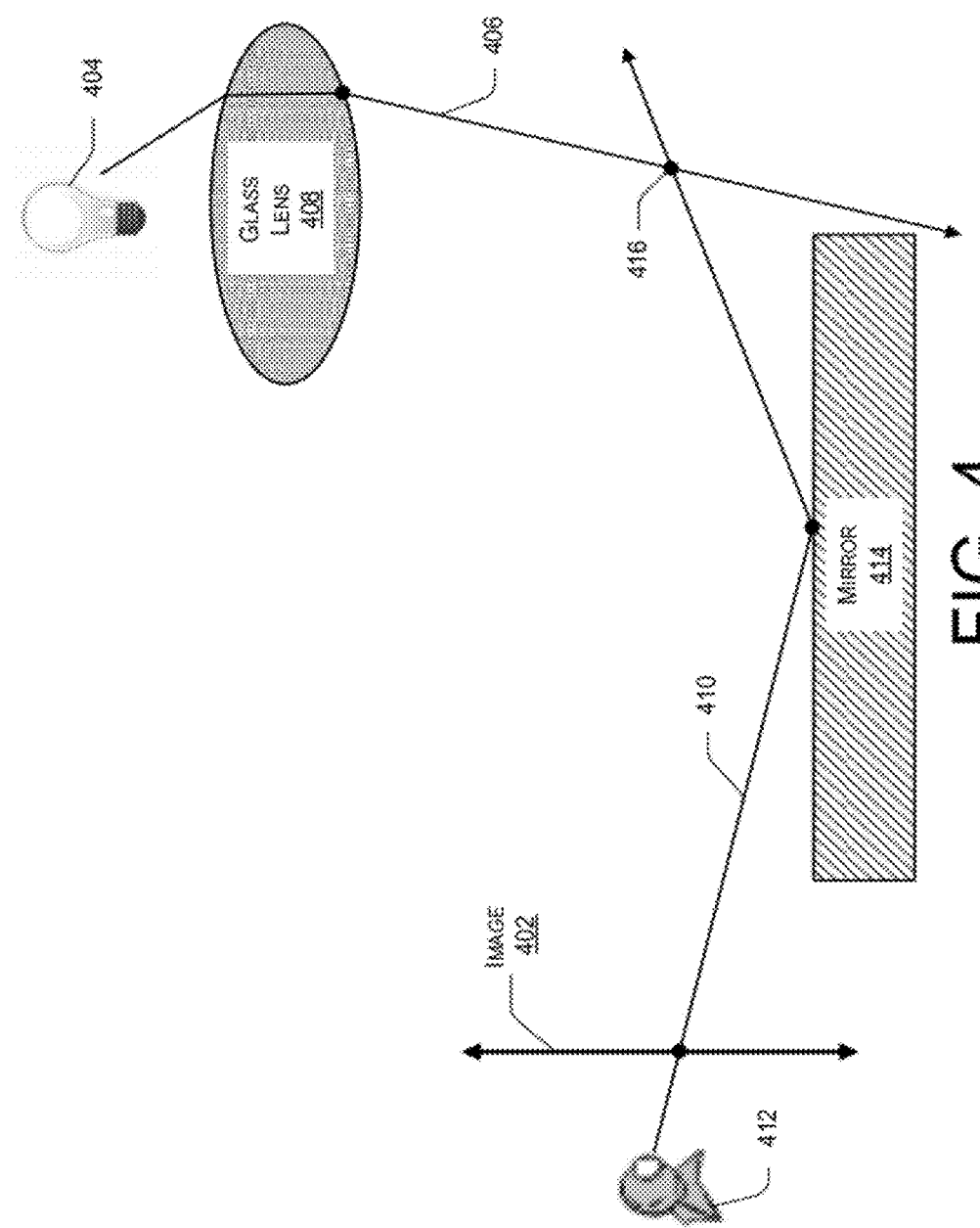
FIG. 4 is a diagram of an example rendering of a single scattering of an image process within the line space gathering framework of FIG. 1.

FIG. 4 illustrates a process for line space gathering to render a single scattering of an image 402. The process includes, without limitation, a first phase and a second phase. In one implementation, the first phase includes shooting a light ray 406 from a light source 404 and through a glass lens 408. While only one light ray is shown in FIG. 4, it is to be appreciated that more than one light ray may be emitted from light source 404. However, the utilization of a small number of light rays to represent a flux distribution in a volume of fixed resolution (hereinafter "volume") may increase storage efficiency within the environment described above with respect to FIG. 1. During the second phase of the process a viewing ray 410 may be discharged from a viewing ray source 412. In one implementation, the viewing ray source is a camera. The viewing ray may be transmitted through the volume, reflecting off of mirror 414, and travelling to gather radiance at one or more intersections between the lighting ray 406 and the viewing ray 410, for example, intersection point 416.

During the tracing of the lighting rays and viewing rays, the lighting rays and the viewing rays may be reflected and refracted multiple times. However, the computation described below should utilize an initial flux of each lighting ray segment and an initial transmittance-to-viewpoint of each viewing ray segment.

One of the main challenges of line space gathering techniques lies within the capacity to find a point where a lighting ray and a viewing ray approximately intersect. Although it may seem to be relatively straightforward to determine whether two lines intersect, how to efficiently query for lines, such as lighting rays, that nearly intersect another given line, such as a viewing ray, may present many obstacles. Furthermore, the number of obstacles may increase in complexity when considering rays that undergo numerous directional changes within a scene.

Figure 5:
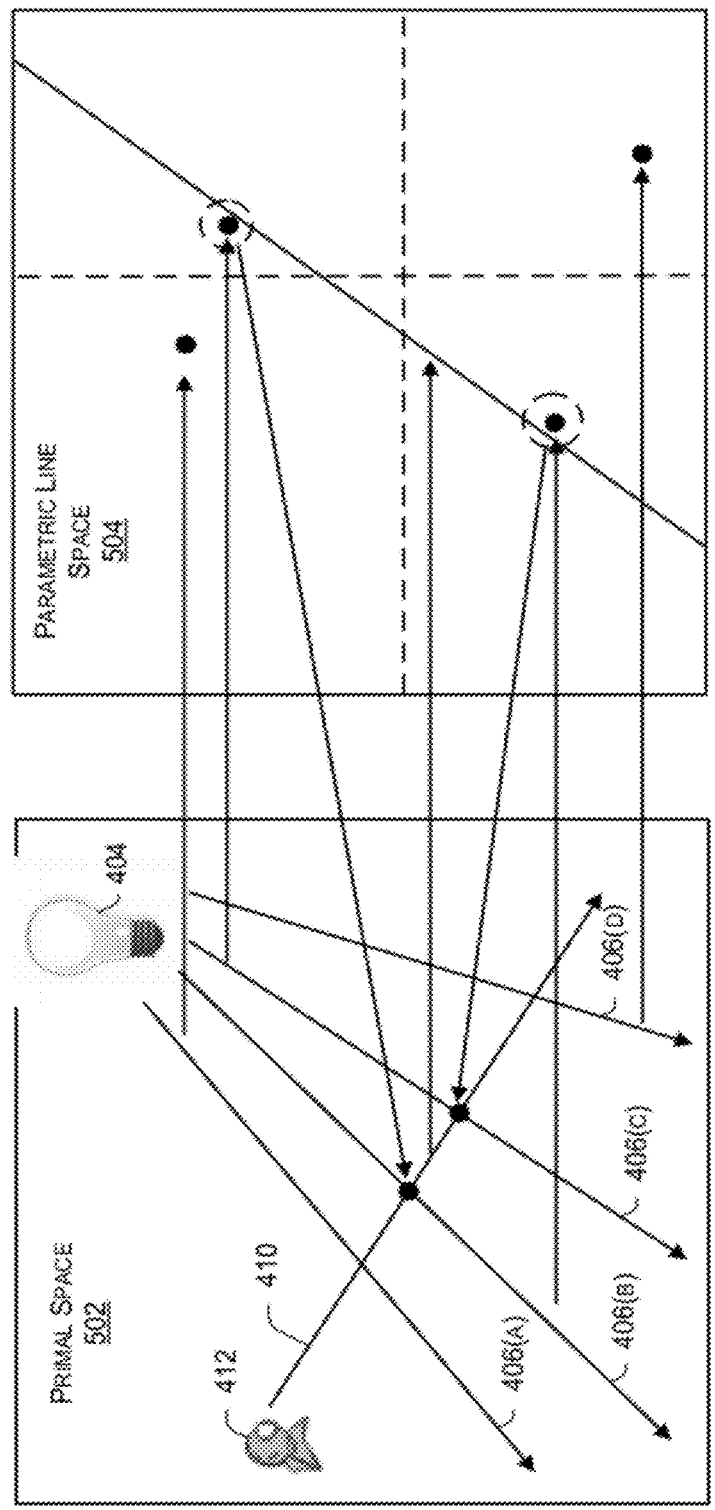
FIG. 5 is a diagram of a conversion environment within the line space gathering framework of FIG. 1.

FIG. 5 illustrates a representation of a 3D primal space (hereinafter referred to as 3D space) 502 to a 6D parametric line space (hereinafter referred to as 6D space) 504. Utilizing the line space gathering module 104, in one implementation the representation may begin by tracing the lighting rays 406(A), 406(B), 406(C), and 406(D) and the viewing ray 410 from the light source 404 and the view source 412, respectively, in 3D space. Within the 6D parametric line space 504, each lighting ray may be represented as a 6D point, referred to as a Plücker coordinate, and each viewing ray may be represented as a Plücker coefficient. In one implementation, the Plücker coefficient describes a 6D hyper plane that passes through the origin. The distance between a point made up of Plücker coordinates and a plane established using the Plücker coefficients in 6D space is related to the corresponding distance between a lighting ray and viewing ray in the 3D space. From the distances determined in 6D space, intersections between lighting rays and viewing rays may be identified. In one implementation, the 6D hyper plane determined by the viewing rays is used to query the 6D points established by the lighting rays in the hierarchical structure. For each point gathered by a plane query, there is potentially an intersection between a lighting ray and a viewing ray. The exact intersection points may be determined in 3D space and an estimation of the radiance transfer according to the calculated distance and the Plücker coefficients of the participating media may be made. From the transferred radiance determined along a viewing ray, the final single scattering radiance may be computed.

Determination of Plücker Coordinates and Coefficients

Given an oriented straight line l in 3D space, defined by two points $a=(a_1, a_2, a_3, a_4)$ and $b=(b_1, b_2, b_3, b_4)$ in homogeneous coordinates, the corresponding Plücker coordinates $\pi(l)$ and coefficients $\overline{\omega}(l)$ may be calculated as:

$$\pi(l) = \{l_{(1,2)}, l_{(1,3)}, l_{(1,4)}, l_{(2,3)}, l_{(2,4)}, l_{(3,4)}\} \quad \text{Equation (1)}$$

$$\overline{\omega}(l) = \{l_{(3,4)}, -l_{(2,4)}, l_{(1,4)}, -l_{(2,3)}, l_{(1,2)}\} \quad \text{Equation (2)}$$

$$l(i,j) = a_i b_j - a_j b_i \quad \text{Equation (3)}$$

As a result of geometric duality, each straight line in 3D space maps to a point in 6D space as its Plücker coordinates and a hyper plane passing through the origin in 6D space with its Plücker coefficients.

Utilizing the corresponding Plücker coordinates and coefficients, an incidence of the lines in 3D space can be determined. For example, consider two lines l and l' determined by four vertices a, b, and a', b'. The dot product of l and l' may be expressed as a 4×4 determinant of 4 vertices. For example:

$$\pi(l) \cdot \overline{\omega}(l) = \begin{vmatrix} a_1 & a_2 & a_3 & a_4 \\ b_1 & b_2 & b_3 & b_4 \\ a'_1 & a'_2 & a'_3 & a'_4 \\ b'_1 & b'_2 & b'_3 & b'_4 \end{vmatrix} \quad \text{Equation (4)}$$

If the two lines lie on the same plane, the determinant will be equal to zero. This is typically based upon the fact that the determinant has a rank of at most three if one of the vertices lies on the plane determined by the other three vertices. Except for the special case of parallel lines, a zero determinant indicates an intersection between the two lines l and l' will not exactly be equal to Equation (4), but instead an approximation that is related to it.

Figure 6:
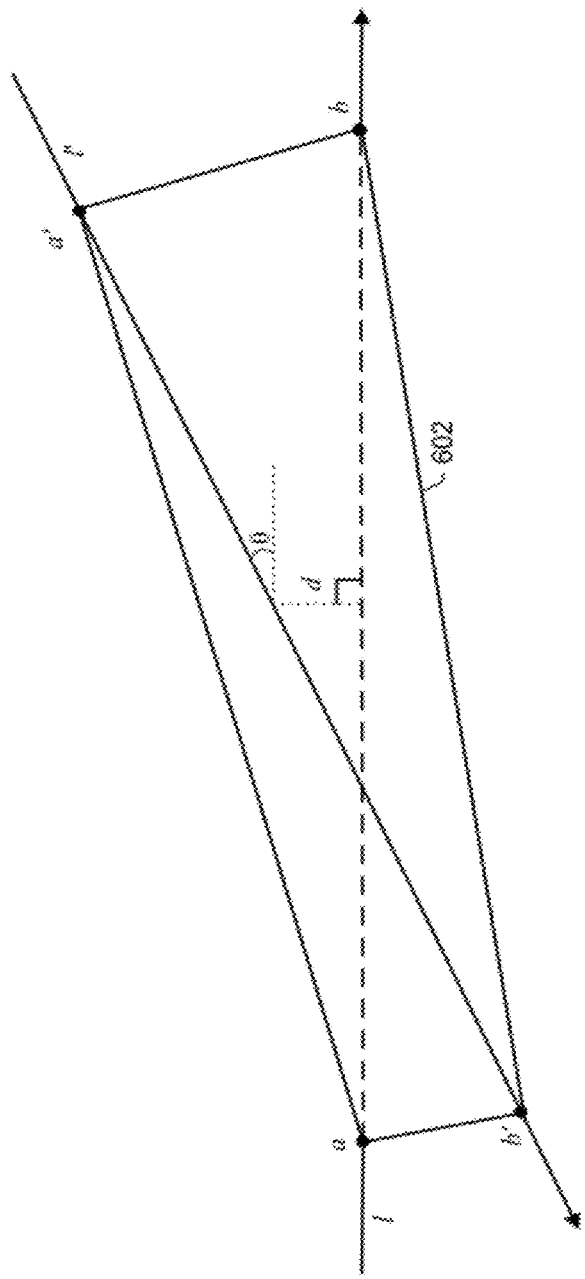
FIG. 6 is a diagram of a tetrahedron constructed to determine distances within the line space gathering framework of FIG. 1.

As shown in FIG. 6, to achieve the necessary approximation, the four vertices a, a, b, b' may be converted from the homogeneous coordinates to the corresponding equivalent Cartesian coordinates with the last coordinate value set to one. Using this conversion, the absolute magnitude of the determinant shown in Equation (4) becomes equal to one-sixth of the volume of the tetrahedron 602 defined by the four vertices a, a', b, b'.

However, the volume of the tetrahedron 602 is not solely determined by the distance between the two straight lines. If the vertices are positioned at a fixed distance c apart such that (a,b) and (a',b') span the scene, and the closest points on the two lines exist within the scene, the volume of the tetrahedron may be used as a lower bound of the distance d between the light ray and the viewing ray. For example, the volume of the of the tetrahedron may be:

$$V_{\{a,b,a'b'\}} = 1/6 |\pi(l) \cdot \varpi(l')| \quad \text{Equation (5)}$$

$$\geq 1/6 \|a-b\| \|a'-b'\| d \sin \theta \quad \text{Equation (6)}$$

assuming a fixed distance c for both of (a,b) and (a',b'):

$$d \geq \frac{6V_{\{a,b,a',b'\}}}{c^2} = \frac{|\pi(l) \cdot \varpi(l)|}{c^2} \quad \text{Equation (7)}$$

Utilizing this lower bound as a distance metric, the closest lighting rays may be found from a constructed spatial hierarchy on the point of $\pi(l)$ in 6D space. This form of a hierarchy is a perfect 8-ary tree. Such a hierarchy may be constructed using a balanced kd-tree and a median splitting technique, with each leaf node containing at least four points. Collapsing every three non-leaf levels into one level, one each non-leaf node will have exactly 8 children. Traversing the hierarchy in depth first order, the buffer locations of parents, children and siblings can be determined from a node's position because the hierarchy is a perfect 8-ary tree. Such a traversal may be thought of as a form of a stackless traversal. The 6D space enables the construction of this spatial hierarchy of the lighting rays to accelerate a search for lighting rays nearest to each viewing ray.

Figure 7:
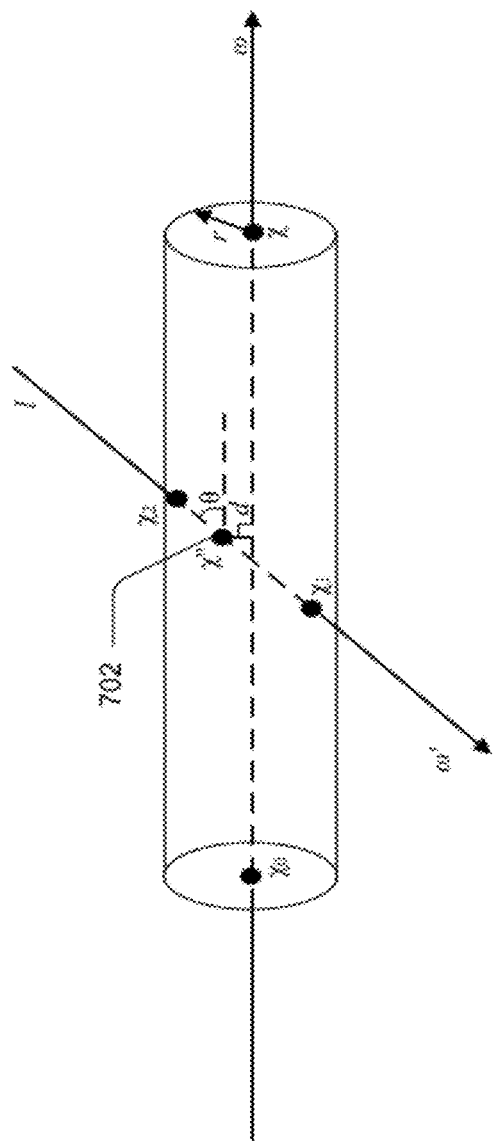
FIG. 7 is a diagram of an evaluation of a radiance transfer within the line space gathering framework of FIG. 1.

As illustrated in FIG. 7, after detecting intersections in 6D space and locating the exact intersection position in 3D space, a radiance estimation at point 702 may be computed within the 3D space. In one implementation, the radiance estimation is built based upon two assumptions. First assumption is that a kernel of a radius r is needed because the probability of two lines intersecting each other typically approaches zero. Second, because r is small, it may be assumed that the radiance between $x_1$ and $x_2$ is constant, and represented by x".

Using these two assumptions, within a participating medium, the radiance transfer between two points from $\chi_0$ to $\chi$ along a line segment with direction $\vec{\omega}$ may be expressed as:

$$L(x, \vec{\omega}) = \tau(x_0, x) L(x_0, \omega) + L_s(x, x_0) \quad \text{Equation (8)}$$

$$L_s(x, x0) = \int_{x_0}^{x} \tau(x', x) \tau(x') L_i(x', \vec{\omega}) dx' \quad \text{Equation (9)}$$

$$L_i(x', \vec{\omega}) = \int_{\Omega} f(x', \vec{\omega}', \vec{\omega}) L(x', \vec{\omega}) dw' \quad \text{Equation (10)}$$

Following the notation in $L(x, \vec{\omega})$ represents the radiance arriving at point x along direction $\vec{\omega}$. In one implementation, $L_i(x', \vec{\omega})$ is in the inscattered radiance at point x' towards x and $\tau(x',x)$ is the transmittance between these two points and is computed as $e-\int_{x'}^{x} k(\xi)d\xi$, where k denotes an extinction coefficient, which is the sum of the scattering coefficient $\tau$ and the absorption coefficient $\alpha$. Furthermore, $f(x'\vec{\omega}', \vec{\omega})$ is the normalized phase function that determines the relative proportion of light arriving at $\chi'$ from direction $\vec{\omega}'$ that is scattered toward direction $\vec{\omega}$.

Furthermore, the radiance transfer for single scattering is evaluated at the intersection points between the lighting ray and the viewing ray. At an intersection, some flux from the lighting ray may be lost along the viewing ray during a scene traversal. Therefore, the radiance contributed by a lighting ray to the viewing ray, as shown in FIG. 7, may be computed as:

$$L_r(x, x_0, l) = \int_{x_1}^{x_2} \omega(x'.x, \vec{\omega}', \vec{\omega}) \Phi_l(x'', \vec{\omega}') dx' \quad \text{Equation (11)}$$

$$\omega(x', x, \vec{\omega}', \vec{\omega}) = \frac{\tau(x', x)\sigma(x')f(x', \vec{\omega}', \vec{\omega})}{\pi r^2 \|x - x_0\|} \quad \text{Equation (12)}$$

where $\vec{\omega}'$ is the direction of the lighting ray l, and $\Phi(x', \vec{\omega}')$ is the flux it carries at x' along the ray direction. Because the radius of the beam is very small, the flux of the ray and the traversed volumetric material may be considered to be approximately constant such that $\omega(x', x, \vec{\omega}', \vec{\omega})$ may be moved outside the integral of Equation (11). For example:

$$L_r(x, x_0, l) \approx \omega(x'', x', \vec{\omega}', \vec{\omega}) \Phi_l(x'', \vec{\omega}') \frac{(r^2 - d^2)^{1/2}}{\sin\theta} \quad \text{Equation (13)}$$

where x" is the point on the light ray closest to the line segment between points x and $x_0$, and d is the corresponding distance. The angle between the two rays is denoted by $\theta$. From equation (13), a simple approximation of Equation (9) may be obtained as the summed radiance contributed by all lighting rays passing through the cylinder:

$$L_s(x,x_o) \approx \Sigma_{l=1}^{n} L_r(x,x_o,l) \quad \text{Equation (14)}$$

Using this formulation, it is assumed, as discussed above, that the closes points between the lighting rays and the viewing rays do not lie at an endpoint of a ray segment of the scene. That is because the ray segments in a scene are generally much longer than the gathering radius r.

As discussed above, the second assumption addresses the idea that the radiance computation should consider only exact intersections between lighting rays and viewing rays, a kernel of radius r is added because the probability of two lines intersecting each other approaches zero. Equations (8) and (14) allow for the direct computation of the radiance transport between lighting rays and viewing rays without an intermediate representation of a photon or a sampling point. By tracing rays from the light source and viewpoint, the radiance from the lighting rays at the intersection points for each viewing ray may be gathered. The radiances along the viewing rays may then be deposited to a corresponding pixel of the scene to generate the final image.

Exemplary Process

Figure 8:
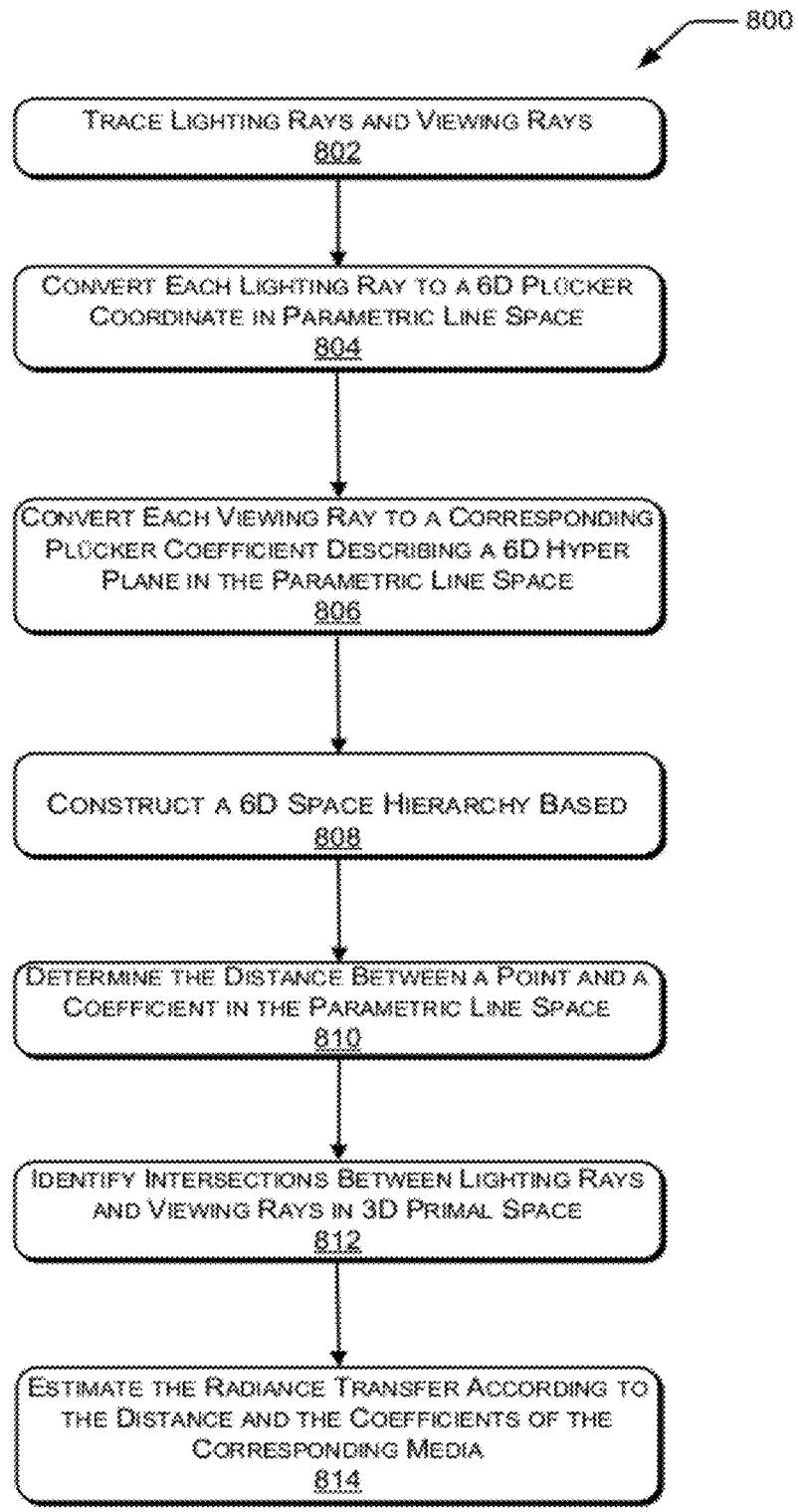
FIG. 8 is a flow diagram of an example process to render a single scattering with homogeneous participating media according to some implementations.

FIG. 8 illustrates a flow diagram of an example process 800 outlining the rendering of a single scattering with homogeneous participating media using a light ray gathering approach. In the flow diagram, the operations are summarized in individual blocks. The operations may be performed in hardware, or as processor-executable instructions (software or firmware) that may be executed by one or more processors. Further, the process 800 may, but need not necessarily, be implemented using the framework of FIG. 1.

At block 802, lighting rays and viewing rays are traced from the light source and the view source, respectively. The lighting rays and the viewing rays may be reflected and refracted multiple times. However, the computation described below should utilize an initial flux of each lighting ray segment and an initial transmittance-to-viewpoint of each viewing ray segment.

At block 804, each lighting ray is represented as a 6D Plücker coordinate in parametric line space. At block 806 each viewing ray is represented as a corresponding 6D Plücker coefficient describing a hyper plane in the parametric line space. The distance between a point and a plane in the 6D space is directly related to the corresponding distance between a lighting ray and a viewing ray in the 3D primal space. It is to be appreciated that block 804 and block 806 need not be completed in any order. For example, block 804 may be completed independent of block 806.

At block 808, construction of a space hierarchy based upon the 6D points of the light rays is performed.

At block 810, determination of the distance between a point and a coefficient may be made. Instead of searching for straight lines that exactly intersect, seeking one or more lines nearest to a viewing ray and derive an approximation that is related to the determinant found above in Equation (4).

At block 812, after detecting intersections in 6D space and the exact intersection position is identified in 3D space. At block 814, the radiance estimation at point may also be computed in 3D space to produce a final media stream 118.

CONCLUSION

Although a process for rendering a single scattering using a light ray gathering approach has been described in language specific to structural features and/or methods, it is to be understood that the subject of the appended claims are not necessarily limited to the specific features or methods described. Rather, the specific features and methods are disclosed as example implementations.

What is claimed is:

1. A computer-implemented method for light gathering in a homogeneous media, the method comprising:
    without photon representation, using a light ray gathering module to trace (i) one or more lighting rays emitted from a light source and (ii) one or more viewing rays emitted from view source in a first space;
    representing each lighting ray as a Plücker coordinate in a second space;
    representing each viewing ray as a Plücker coefficient describing a hyper plane in the second space;
    determining the distance between at least one of the Plücker coordinates and at least one of the corresponding Plücker coefficients in the second space, such that the distance determined in the second space is related to the distance of the corresponding lighting ray and viewing ray in the first space;
    computing (i) initial flux of the one or more lighting rays in the second space and (ii) initial transmittance to the view source of the one or more viewing rays in the second space; and
    evaluating a final radiance along the viewing ray based upon a lighting ray passing nearest to the viewing ray.

2. The computer-implemented method of claim 1, wherein the one or more lighting rays and the one or more viewing rays are reflected and refracted multiple times.

3. The computer-implemented method of claim 1, wherein the determining the distance between the at least one Plücker coordinate and the at least one Plücker coefficient comprises searching for one or more lighting rays nearest to a viewing ray.

4. The computer-implemented method of claim 1 further comprising utilizing the hyper plane described by a Plücker coefficient to query one or more Plücker coordinates established by the one or more corresponding lighting rays.

5. The computer-implemented method of claim 4, wherein for each point gathered by a hyper plane query there is a corresponding intersection point between a lighting ray and a viewing ray.

6. The computer-implemented method of claim 1 further comprising depositing the final radiance of a viewing ray to a corresponding pixel of a scene to generate a final image.

7. A system comprising:
    a memory;
    one or more processors coupled to the memory; and
    a line gathering module operable on the one or more processors, the line gathering module configured to:
        without photon representation, represent a lighting ray as a coordinate and a viewing ray as a coefficient in a 6D parametric line space;
        compute (i) initial flux of the lighting ray in the 6D parametric line space and (ii) initial transmittance to a view source of the viewing ray in the 6D parametric line space; and
        construct a spatial hierarchy using the coefficient and the coordinate, the spatial hierarchy configured to perform a search comprising a plane query within a given set of points.

8. The system of claim 7, wherein the constructing the spatial hierarchy enables an accelerated search for the first ray which lies nearest to each identified second ray.

9. The system of claim 7, wherein the first ray is represented as a Plücker coordinate in the 6D parametric line space.

10. The system of claim 9, wherein the second ray is represented as a Plücker coefficient defining a 6D hyper plane in the 6D parametric line space.

11. The system of claim 10, wherein the 6D hyper plane is utilized to query the Plücker coordinate in the spatial hierarchy.

12. The system of claim 7, wherein a lighting ray closest to a viewing ray may be determined using the constructed spatial hierarchy, the spatial hierarchy comprising a point $\pi$ (I) in the 6D parametric line space.

13. One or more computer storage devices storing computer-executable instructions that, when executed on one or more processors, cause the one or more processors to perform operations comprising:
    without photon representation, gathering light rays to render a single scattering with a homogeneous media;

facilitating a search within a scene of the homogeneous media to identify a lighting ray passing nearest to a recognized viewing ray;
representing the identified lighting ray as a Plücker coordinate in a 6D space;
representing the recognized viewing ray as a Plücker coefficient in a 6D space;
computing (i) initial flux of the identified lighting ray in the 6D space and (ii) initial transmittance to a view source of the recognized viewing ray in the 6D space; and
evaluating a final radiance along the recognized viewing ray based upon the identified lighting ray passing nearest to the recognized viewing ray.

14. The one or more computer storage devices of claim 13, wherein the Plücker coefficient defines a hyper plane passing through an origin in the 6D space.

15. The one or more computer storage devices of claim 14, wherein the hyper plane is employed to query the Plücker coordinate in a spatial hierarchy to facilitate the search.

16. The one or more computer storage devices of claim 13, further comprising locating an intersection point between the identified lighting ray and the recognized viewing ray in 3D space, the intersection point determined based upon a distance between the lighting ray and the viewing ray detected in 6D space.

17. The one or more computer storage devices of claim 13, wherein the final radiance transfer is deposited to a corresponding pixel of the scene to generate a final image.

* * * * *